United States Patent [19]
Johnson et al.

[11] 3,814,444
[45] June 4, 1974

[54] LOW FRICTION PISTON RING
[75] Inventors: Stephen I. Johnson; Harry B. Thompson, both of Hastings, Mich.
[73] Assignee: Hastings Manufacturing Company, Hastings, Mich.
[22] Filed: July 18, 1972
[21] Appl. No.: 272,983

[52] U.S. Cl. ............................................. 277/139
[51] Int. Cl. ............................. F16j 9/06, F02f 5/00
[58] Field of Search ........... 277/139, 140, 141, 138, 277/160

[56] References Cited
UNITED STATES PATENTS
2,656,230   10/1953   Phillips .............................. 277/139
2,777,740   1/1957    Pien ................................... 277/139
2,904,377   9/1959    Endres et al. ....................... 277/139

FOREIGN PATENTS OR APPLICATIONS
1,267,207   6/1961    France ............................... 277/139

*Primary Examiner*—Samuel B. Rothberg
*Attorney, Agent, or Firm*—Austin A. Webb

[57]  ABSTRACT

Thin annular steel rails, split radially, are arranged flatwise on opposite sides of a corrugated annular expander, with shoulders on the expander engaging the radially inner edges of the rails. The area of contact between the rails and the expander is reduced to decrease friction by:

A. forming radially extending peaks on the corrugations of the expander to present line contact areas to the sides of the rails.

B. Reducing the axial height of alternate corrugations of the spacer, to reduce the number of contact points between the expander and the rails.

C. Forming narrow axially extending annular projections on the faces of the rails to form line or point contacts with the corrugations on the spreader.

D. Shaping the shoulders on the spacer to present line contacts with the inner edges of the rings.

E. Combinations of A, B, C and D.

5 Claims, 7 Drawing Figures

3,814,444

LOW FRICTION PISTON RING

OUTLINE OF INVENTION

Three piece oil control rings for internal combustion engines are old and commonly provide a corrugated annular expander which has angularly spaced axially facing surfaces which support the opposed faces of two flat annular rails within the ring groove of a piston. Axial projections formed by various shapes toward the radially inner side of the expander engage the rails to force the rails out against the surface of the cylinder wall. During operation of the engine, the parts of the ring shift relative to each other. It is the primary purpose of the invention to reduce the interpart friction in the ring by reducing the points and areas of contact between its parts, and thus reduce the over-all friction of the engine and increase its efficiency.

DESCRIPTION

The drawings, of which there are two sheets, illustrate several variations of shapes of the parts of a piston ring, and different combinations of those shapes, which reduce the areas of contact and the friction between the parts.

Figure 1:
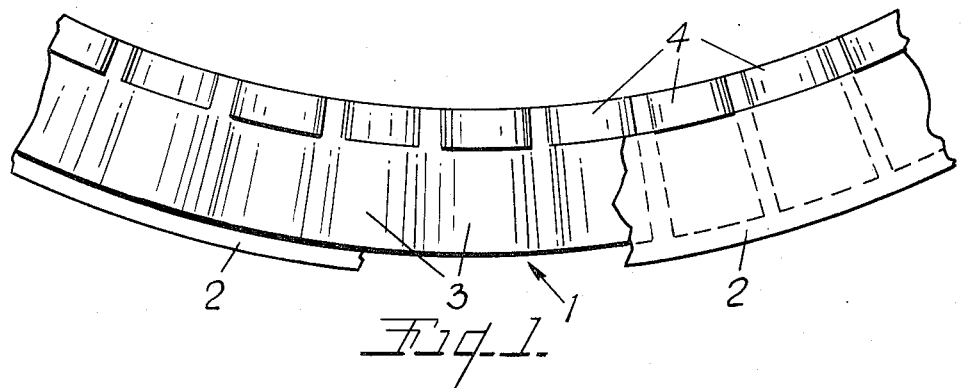
FIG. 1 is a fragmentary plan view of a sector of an oil ring constructed according to one form of the invention.
Figure 2:
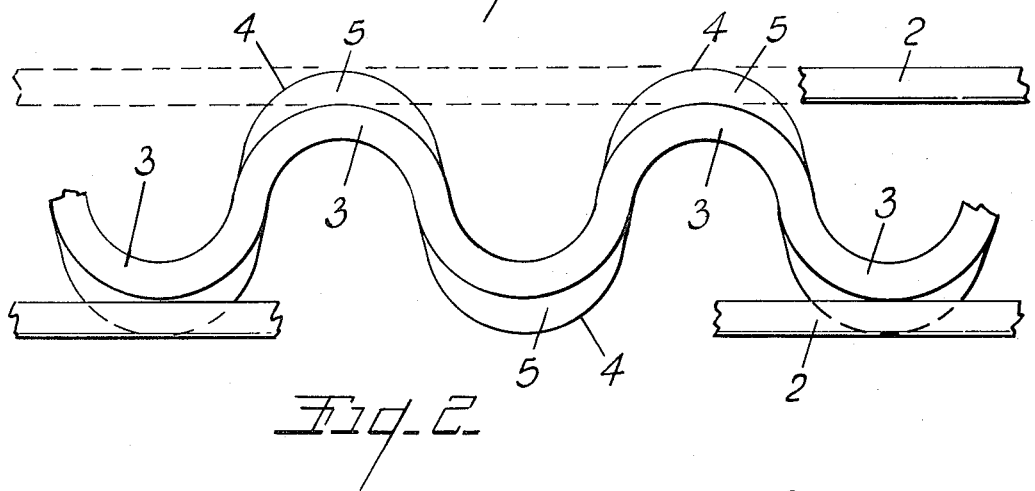
FIG. 2 is a fragmentary edge elevational view of the ring in FIG. 1.

FIGS. 1 and 2 illustrate a three part oil control ring consisting of an annular spreader 1 and upper and lower rails 2 which are identical. The spreader is axially corrugated by folding a strip of metal up and down transversely of the general plane of the ring. This produces radially extending and axially oppositely projecting upper and lower peaks 3 arranged in alternating relation around the spacer. The surfaces of the peaks are rounded or axially convex to make a plurality of line contacts with the opposed surfaces of the rails 2. Radially inwardly of the peaks 3, the corrugating folds in the spreader are axially deeper as at 4. This forms radially outwardly facing crescent shaped shoulders 5 which engage the radially inner edges of the rails.

It will be evident that as the ring assembly is carried up and down in the groove of a reciprocating piston, the rails and spreader will flex radially so that the outer edges of the rails maintain wiping contact with the cylinder wall, as in prior ring assemblies. However, during this flexing motion, the opposed faces of the rails make only line contact with the peaks 3. This results in less friction between the parts, which in turn reduces the friction load of the piston which must be overcome by the engine. The reduction in friction results from hydrodynamic support of the parts as will be described presently.

Figure 3:
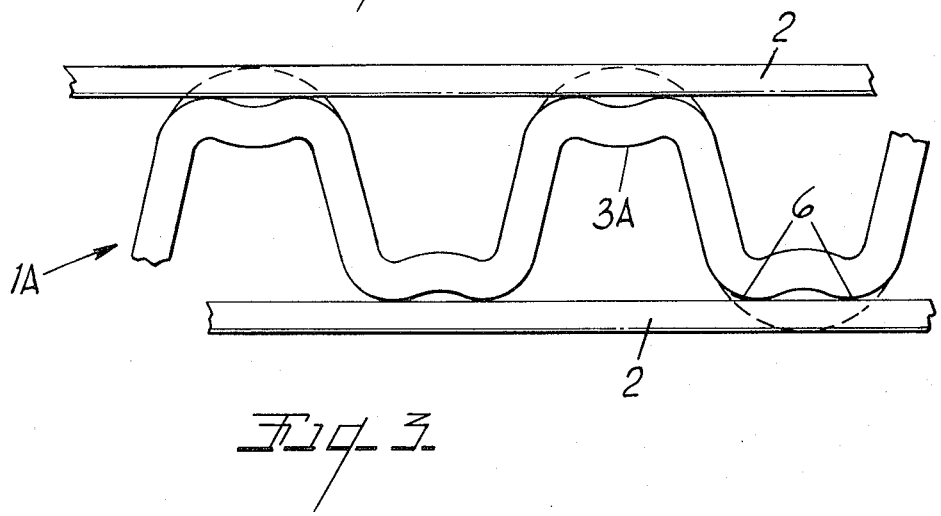
FIG. 3 is an edge elevational view of a first modified form or shape of the spreader.

FIG. 3 shows a modified spreader 1A in which the peaks 3A are axially offset in the center so as to leave two angularly spaced axial protrusions 6 which make radial line contacts with the rails. The action is essentially the same as in the first ring assembly, but axial support of the rails is distributed in more closely angularly spaced lines around the ring.

Figure 4:
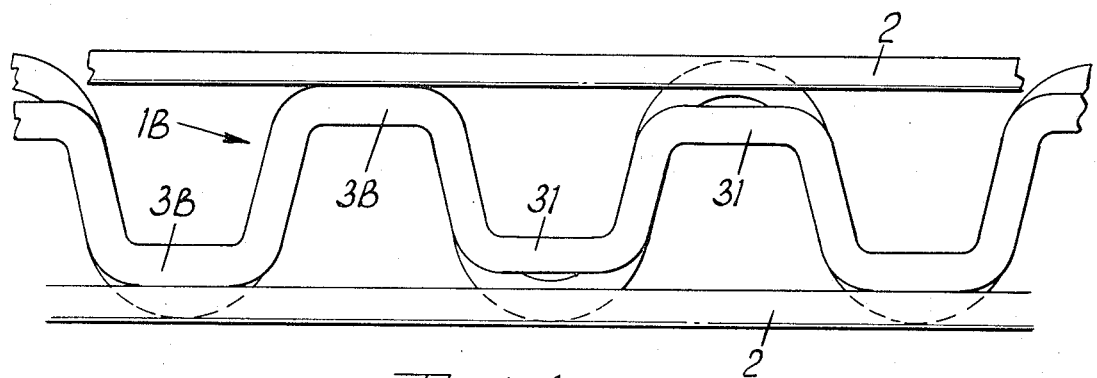
FIG. 4 is an edge elevational view of a second modified form or shape of the spreader.

The modified spreader 1B in FIG. 4 has peaks 3B that are flatted on the top and thus have a measurable area of contact with the rails 2. However, alternate peaks 31 are axially shorter or lower than the intervening peaks, and so make no contact at all with the rails. The amount of friction between the parts is thus reduced by substantially one-half that encountered in old rings.

Figure 5:
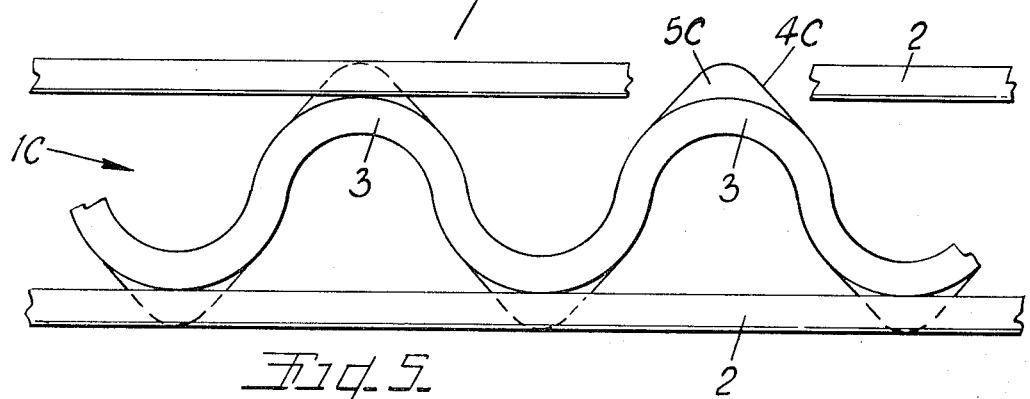
FIG. 5 is an edge elevational view of a third modified shape of the spreader.

The modified spreader 1C shown in FIG. 5 reduces the area of contact in a different and additional portion of the parts. The rail supporting peaks 3 are rounded to make line contacts as in FIGS. 1 and 2, but the radially inner peaks 4C are more sharply peaked to form generally triangular shoulders 5C which contact the inner edges of the rails. This reduces the area of contact, and friction, at the inner edges of the rails.

Figure 6:
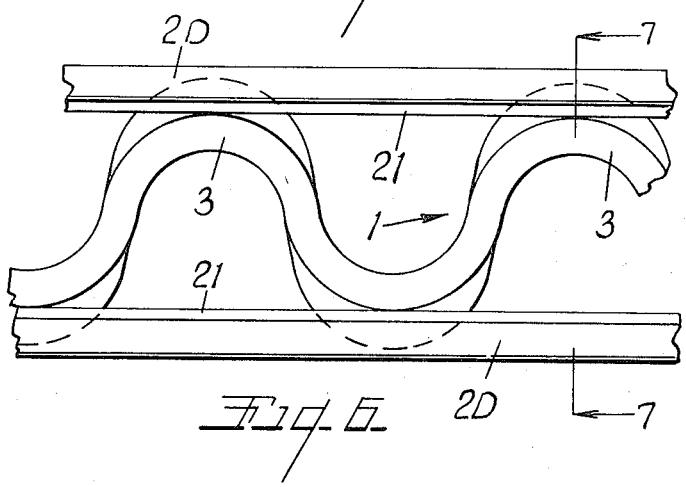
FIG. 6 is an edge elevational view of a modified ring assembly in which the cross sectional shape of rails is modified.
Figure 7:
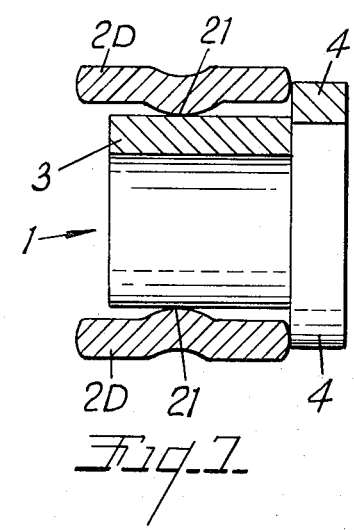
FIg. 7 is a radial cross sectional view through the assembly in FIG. 6.

FIGS. 6 and 7 show a further modified assembly in which both the spreader and the rails are shaped to reduce the area of contact and the friction between the parts. The spreader 1 has the same axially rounded peaks 3 as in FIG. 1, but the rails 2D are given an axially offset annular bead or rib 21. This may be produced by die stamping, or preferably by being drawn into the cross section of the stock when the wire stock from which the rails are commonly formed is drawn or rolled into a flat ribbon, and before the rails are coiled into circular shape. The rib 21 makes a theoretical point contact with each of the rounded peaks 3, thus further reducing the area of contact and friction. Incidentally, the depression in the axially outer side of the rail, opposite the bead 21 reduces the area of contact between the rail and the side of the ring groove in the piston, while retaining two flat annular sealing surfaces to contact the groove wall.

In all forms of the ring as illustrated it should be appreciated that the parts are substantially fully immersed in oil during operation. The method of lubrication is well known and consists of an excess of oil splashed or sprayed onto the cylinder walls of the engine, which oil is then wiped or scraped off of the cylinder wall by the projecting edges of the rails 2 as the piston and rails reciprocate. Part of the excess oil scraped from the cylinder walls is forced or pumped, more or less continuously, radially inwardly between the rails 2 and through the spreader 1 and submerges the parts in oil.

The axially directed loads between the rails and the spreader are accordingly carried on thin films of oil; and the friction created by relative movement between the parts takes place under what is known as hydrodynamic lubrication. The configuration of the meeting parts of the rails and spreader as shown reduces the sum total of the area of the oil film between bearing areas of the parts; and since the frictional force resisting relative movement between the parts is created by internal fluid friction in the supporting film(s), reduction of the area of these films reduces total friction.

The rails are in effect supported by a plurality of angularly spaced, radially extending lines of narrow films in FIGS. 1, 2, 3 and 5. In FIG. 6, the areas of support are angularly spaced points at the crossings of the ribs 21 and the peaks 3. Between the areas of support, the thickness of the supporting film increases rapidly to a substantially free fluid volume of lubricant that presents little internal friction.

In FIG. 4, the support areas along the flats of folds 3B have substantial width and area, but the total of the supporting area is reduced in half by the alternately lower folds 31.

It is pointed out that by combining the axially grooved rails 2D of FIGS. 6 and 7 with the spreader in FIG. 4, angularly spaced arcuate line contacts between the peaks 3B and the rib 21 will result.

Note that no reduction of film area is created between the surfaces of the rails and the opposed surfaces of the grooves in the piston, except in FIGS. 6 and 7. The film in these areas remains and acts both as a lubricant and as a seal against the flow or escape of gases past the rails.

Various combinations and variations of the spacer shapes and ring shapes shown may be made to reduce the friction of the ring, and improve the efficiency of an engine without departing from the theory of the invention as defined in the appended claims.

What is claimed as new is:

1. A piston ring assembly comprising a pair of radially split generally flat annular rails of springable metal, an annular spreader located between said rails and having alternate upward and downward corrugations spaced angularly around its periphery,
   the peaks of said oppositely offset corrugations presenting radially extending line contact surfaces to the opposed surfaces of said rails,
   shoulder portions on the radially inner parts of said corrugations projecting axially beyond said peaks to engage the radially inner edges of said rails,
   and annular axial projections on at least one side of each of said rails arranged to make crossing point contact with the line contact surfaces of said spacer.

2. A piston ring assembly comprising a pair of radially split and generally flat annular rails of springable metal,
   and an annular spreader consisting of a strip of metal with angularly spaced corrugations positioned in axially supporting relation between said rails,
   said rails having annular beads formed therearound to present crossing contact lines to said corrugations.

3. A ring assembly as defined in claim 2 in which the corrugations in the spreader are offset axially oppositely and have radially extending peaks presenting radial line contact areas to said rails and point contact areas to the beads on the rails.

4. A ring assembly as defined in claim 3 in which the beads in said rails are formed as axially offset folds in the rails leaving annular grooves on the outer sides of the rails.

5. A piston ring assembly comprising a pair of radially split and generally flat annular rails of springable metal,
   and an annular spreader located between said rails and having alternate upward and downward corrugations spaced around its periphery presenting spaced peaks toward said rails with axially raised shoulders on the radially inner ends of the peaks arranged to abut the inner edges of the corrugations,
   said spreader being characterized by the fact that alternate ones of said corrugations in each direction are axially shorter than the others whereby said rails are engaged only by the peaks on the longer rails and extend in unsupported relation over the peaks of shorter corrugations located therebetween.

* * * * *